United States Patent [19]

Yonezawa et al.

[11] 4,395,537

[45] Jul. 26, 1983

[54] POLYETHER RESIN AND METHOD OF MANUFACTURING THE SAME

[75] Inventors: Kazuya Yonezawa; Masahiro Asada, both of Kobe; Miyuki Matsuura, Nishinomiya, all of Japan

[73] Assignee: Kanegafuchi Kagaku Kogyo Kabushiki Kaisha, Osaka, Japan

[21] Appl. No.: 296,209

[22] Filed: Aug. 25, 1981

[30] Foreign Application Priority Data

Sep. 5, 1980 [JP] Japan .................... 55-123659

[51] Int. Cl.³ .............................. C08G 65/40
[52] U.S. Cl. ........................ 528/219; 528/174
[58] Field of Search ..................... 528/219, 174

[56] References Cited

U.S. PATENT DOCUMENTS

| | | | |
|---|---|---|---|
| 2,058,510 | 10/1936 | Rothrock | 528/219 |
| 2,060,715 | 11/1936 | Arvin | 528/219 |
| 2,060,716 | 11/1936 | Arvin | 528/219 |
| 3,069,386 | 12/1962 | Barclay | 528/219 |
| 3,761,449 | 9/1973 | Kaufman | 528/219 |
| 4,136,087 | 1/1979 | Williams et al. | 528/219 |
| 4,163,833 | 8/1979 | Johnson | 528/219 |
| 4,254,252 | 3/1981 | Hay | 528/219 |
| 4,260,733 | 4/1981 | Loucks et al. | 528/219 |
| 4,310,654 | 1/1982 | Carnahan, Jr. | 528/219 |

FOREIGN PATENT DOCUMENTS

| | | | |
|---|---|---|---|
| 702688 | 1/1965 | Canada | 528/219 |
| 1334654 | 7/1963 | France . | |

Primary Examiner—Lester L. Lee

[57] ABSTRACT

A polyether of the general formula:

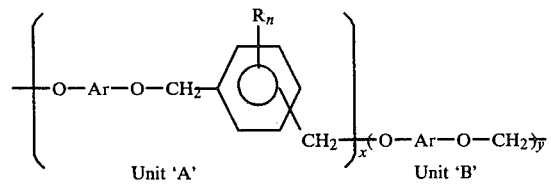

in which Ar stands for a divalent organic group of the aromatic series, R stands for $CH_3$, $CH_3CH_2$, Cl or Br, and n is an integer of 0 to 4. It contains at least 1 mol % of unit 'B'. A method of manufacturing such a polyether is also disclosed.

9 Claims, 6 Drawing Figures

POLYETHER RESIN AND METHOD OF MANUFACTURING THE SAME

BACKGROUND OF THE INVENTION

1. Field of the Invention

This invention relates to a polyether resin, and more particularly, to a polyether resin of the general formula:

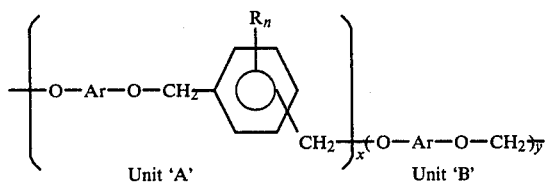

in which Ar stands for a divalent organic group of the aromatic series, R stands for a group selected from the group consisting of $CH_3$, $CH_3CH_2$, Cl and Br, and n is an integer of 0 to 4. The resin contains at least 1 mol % of unit 'B'. This invention is also concerned with a method of manufacturing such a resin.

2. Description of the Prior Art

It is known that polyethers can be synthesized by the reaction between alkali metal salts of phenols and halides. This reaction must, however, be caused to take place in a system not containing water, and in an aprotic polar solvent having a high boiling point, such as dimethylformamide. Accordingly, a long time is required for the separation of the resulting polymer and its purification. The necessity of removing a salt which is formed as a by-product, and recovering the high-boiling temperature solvent is in a disadvantage, including low productivity, and a high cost of manufacture.

SUMMARY OF THE INVENTION

The inventors of this invention have found it possible to manufacture a novel polyether resin of this invention easily if a phase transfer reaction is employed. The phase transfer reaction, and the use of water as a reaction solvent eliminate the necessity which would otherwise develop for removing any salt occurring as a by-product. It is also possible to use an inexpensive, low-boiling temperature solvent selected from among halogenated hydrocarbons or aromatic hydrocarbons, such as chlorobenzene, orthodichlorobenzene, xylene and toluene. In this case, it is very easy to purify the resulting polymer, since it can be precipitated from the reaction system. The polymer of this invention is a non-crystallizable polymer having high heat resistance, and improved moldability, as opposed to a polymer consisting solely of units 'B' formed by a formal bond. It is, therefore, suitable for use in the preparation of a film, sheet, or any other kind of molded product.

BRIEF DESCRIPTION OF THE DRWAINGS

FIGS. 1 to 6 show the infrared absorption spectra of the polymers obtained in EXAMPLES 1 to 6, respectively.

DETAILED DESCRIPTION OF THE INVENTION

Figure 1:
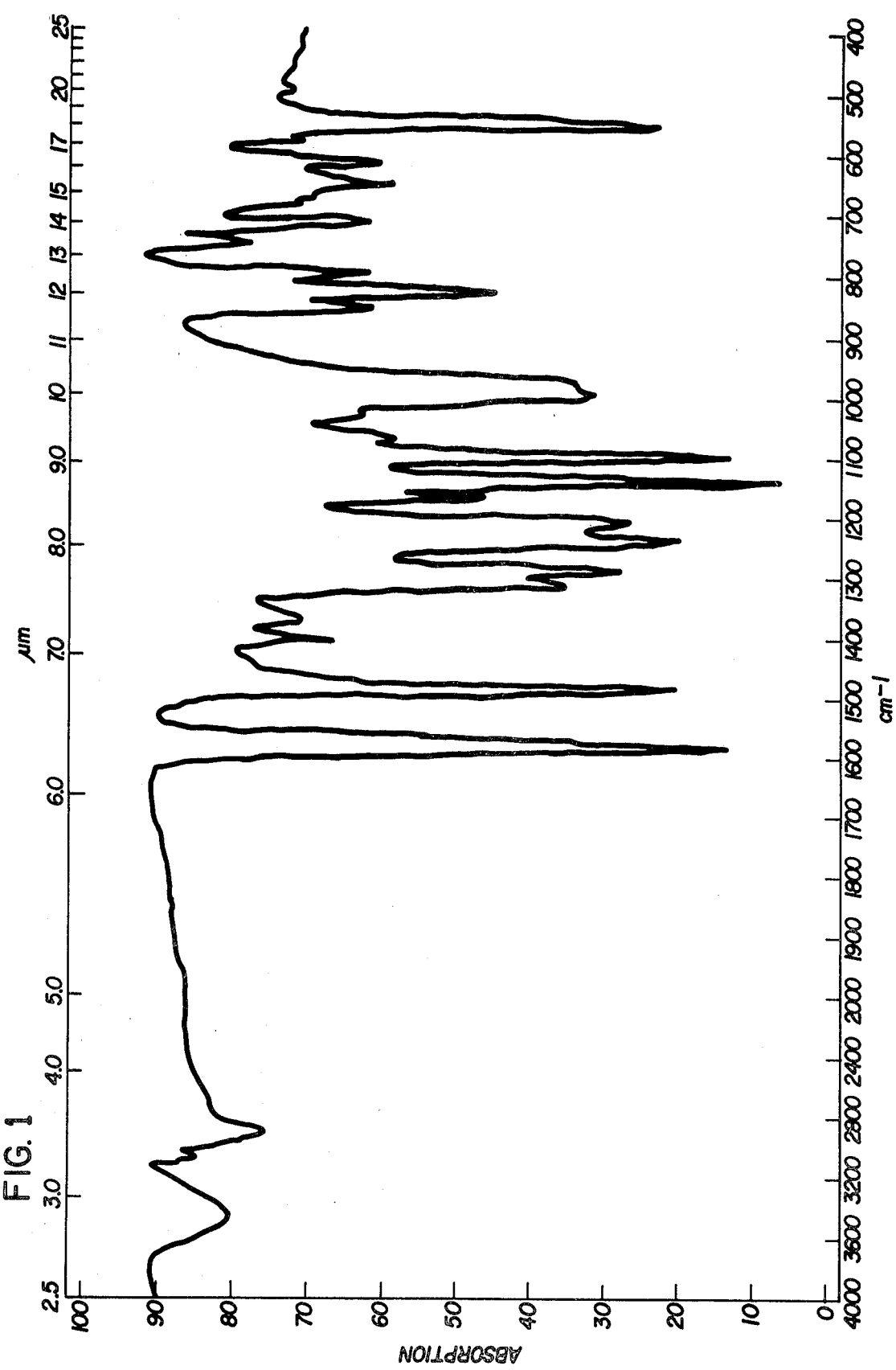

The polyether resin of this invention can be manufactured if a difunctional phenol is dissolved in an aqueous solution of sodium or potassium hydroxide, and the resulting solution is reacted with a halide such as xylylene or methylene dihalide in the presence of a phase transfer catalyst. An organic solvent may or may not be used for the reaction, but if any is used, it is possible to use a desired quantity of a nonreactive solvent selected from among halogenated hydrocarbons such as chlorobenzene and orthodichlorobenzene, or aromatic hydrocarbons such as toluene and xylene, or a mixture thereof.

Suitable examples of the dihalides include o-xylylene dichloride, m-xylylene dichloride, p-xylylene dichloride or dibromide, methylene bromide, methylene chloride, and chlorobromomethane. According to this invention, it is also possible to use effectively a compound formed by introducing one to four substituents, such as $CH_3$, $CH_3CH_2$, Cl or Br, into the benzene ring of xylylene dihalide and bisphenol, depending on the purpose for which the resulting polymer will be used. It is preferable to employ a mixture of methylene and xylylene dihalides. In view of the yield and heat resistance of the polymer to be produced, it is desirable to employ at least 2 mol % of xylylene dihalide for 100 mol % of a difunctional phenol. Methylene dihalide can be used in an excess quantity, and any excess thereof will serve as a solvent.

According to this invention, it is possible to use various kinds of difunctional metal salts of phenol compounds. They are expressed by the general formula:

in which M and M' each stand for an alkali metal, and Ar stands for a divalent aromatic group. Examples of the phenol compounds include those of the general formula:

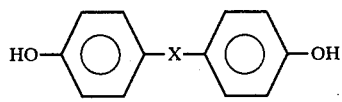

in which X stands for

$-SO_2-$, $-CH_2-$, $-O-$ or $-S-$, and resorcinol, hydroquinone, and 4,4'-dihydroxydiphenyl.

The quantity of the difunctional phenol compound to be employed is preferably equal to, or less than the total quantity of the methylene and xylylene dihalides. The use of any more phenol will result in a product having a low degree of polymerization. It is effective and convenient to employ for the reaction a solution obtained by dissolving any such difunctional phenol compound in an excess aqueous solution of sodium or potassium hydroxide.

The intrinsic viscosity [η] of the reaction product in dimethylacetamide at 32° C. is adjustable if the compounds to be reacted, and their quantities (mol %) are varied, but may usually be in the range of, say, 0.1 to 2.0. It is advantageous to secure an intrinsic viscosity of at least 0.3 if the requirements for other physical properties are taken into consideration.

Examples of the 'phase transfer catalyst' include oil-soluble quaternary ammonium salts such as tetrabutylammonium chloride and trioctylmethylammonium chloride, and quaternary phosphonium salts such as tetraphenylphosphonium chloride and triphenylmethylphosphonium chloride. It is preferable to employ 0.1 to 20 mol %, and more preferably, 1 to 10 mol %, of any such catalyst for 100 mol % of the difunctional phenol compound. The polymerization reaction by any such phase transfer catalyst can usually be carried out at a temperature of 0° C. to 100° C. within a period of 5 to 20 hours.

The polymer of this invention can also be manufactured if an alkali metal salt of a difunctional phenol compound is reacted with a mixture of xylylene and methylene dihalides in an aprotic polar solvent, such as dimethylformamide, in the absence of water. This method, however, requires a lot of time and labor for the removal of a salt occurring as a by-product, and the separation and purification of the polymer. The method relying on the phase transfer reaction as hereinabove described is generally simpler and more advantageous.

The invention will now be described with reference to examples, which are merely illustrative, and do in no way limit the scope of this invention.

EXAMPLE 1

125 Millimols of sodium hydroxide were dissolved in 70 ml of water, and 50 millimols of bisphenol-S were added thereinto to form a homogeneous solution. Added further into the solution were 7.5 millimols of p-xylylene dichloride, 134.6 millimols of methylene bromide, and 2 millimols of trioctylmethylammonium chloride. The solution thus obtained was heated at 40° C. for one hour, and after its temperature had been raised to 90° C., the reaction was continued at 90° C. for three hours, whereby a solid polymer was precipitated. The polymer was crushed, washed with methanol and water, and dried at a reduced pressure, whereby it was purified. It had a melting point of 227° C. to 230° C. If further purification is required, it is possible to conduct reprecipitation by pouring a dimethylacetamide solution of the polymer into an excess quantity of methanol.

FIG. 1 shows the infrared absorption spectrum of the polymer obtained. The elemental analysis of the polymer indicated that it contained 38 mol % of

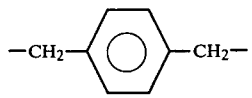

units, and 62 mol % of —CH$_2$— units. It showed an intrinsic viscosity of 1.12 dl/g in dimethylacetamide at 32° C. A film having a thickness of 30μ was formed by casting from a dimethylacetamide solution of the polymer. It showed a tensile strength of 844 kg/cm².

EXAMPLE 2

125 Millimols of sodium hydroxide were dissolved in 70 ml of water, and 50 millimols of bisphenol-S were added thereinto to form a homogeneous solution. Added further thereinto were 5 millimols of p-xylylene dichloride, 67.3 millimols of methylene bromide, and 2 millimols of trioctylmethylammonium chloride. The resulting solution was heated at 40° C. for one hour, and after its temperature had been raised to 90° C., the reaction was continued at 90° C. for three hours, whereby a polymer was obtained.

Figure 2:
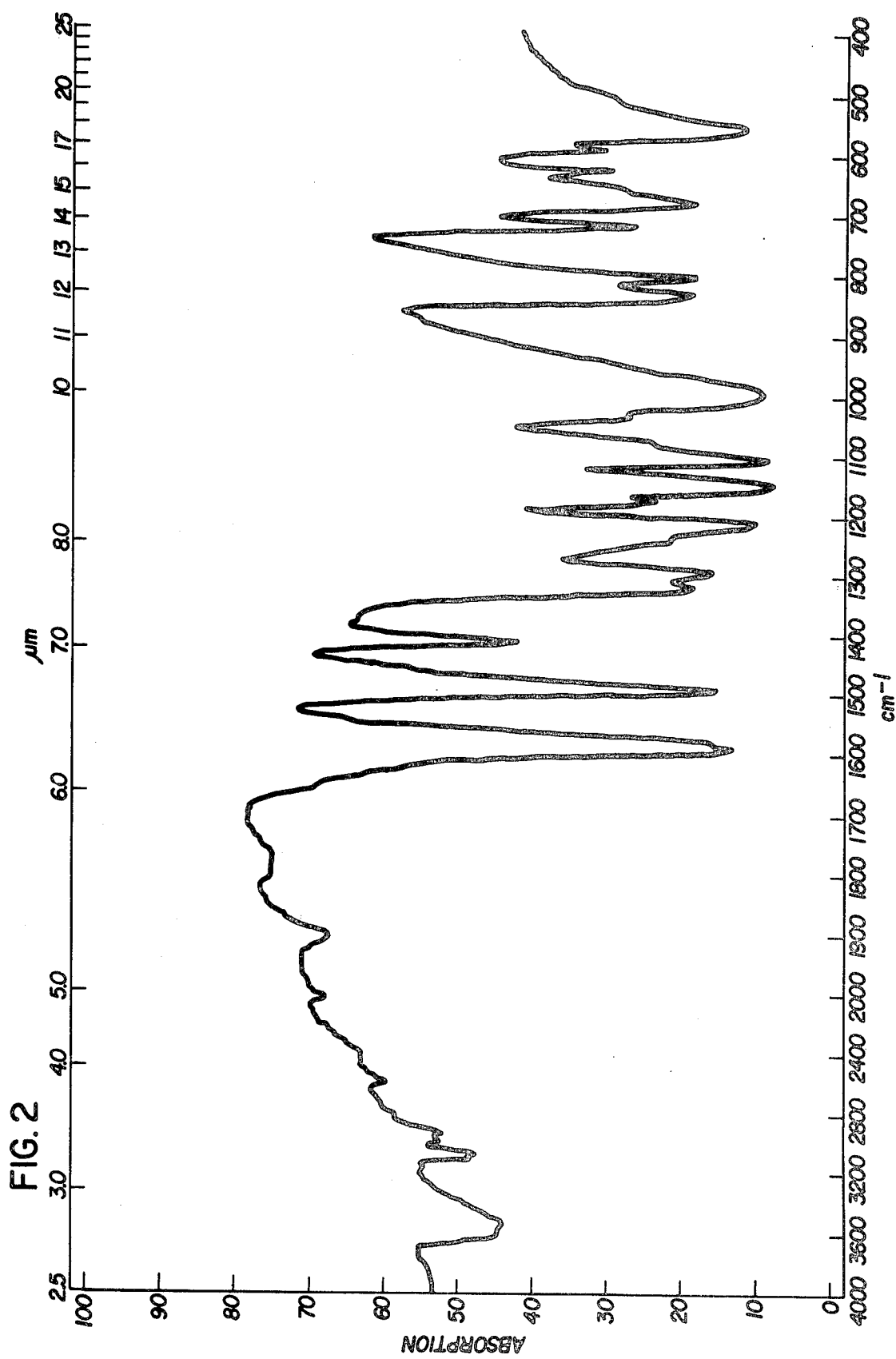

The polymer had a melting point of 225° C. to 235° C., and an intrinsic viscosity [η] of 1.66 in dimethylacetamide at 32° C. FIG. 2 shows the infrared absorption spectrum of the polymer. A film of the polymer prepared by casting from a dimethylacetamide solution thereof, and having a thickness of 32μ showed a tensile strength of 540 kg/cm².

EXAMPLE 3

A polymer was prepared by repeating the procedures of EXAMPLE 1, except that 3.85 millimols of p-xylylene dichloride and 67.3 millimols of methylene bromide were employed.

Figure 3:
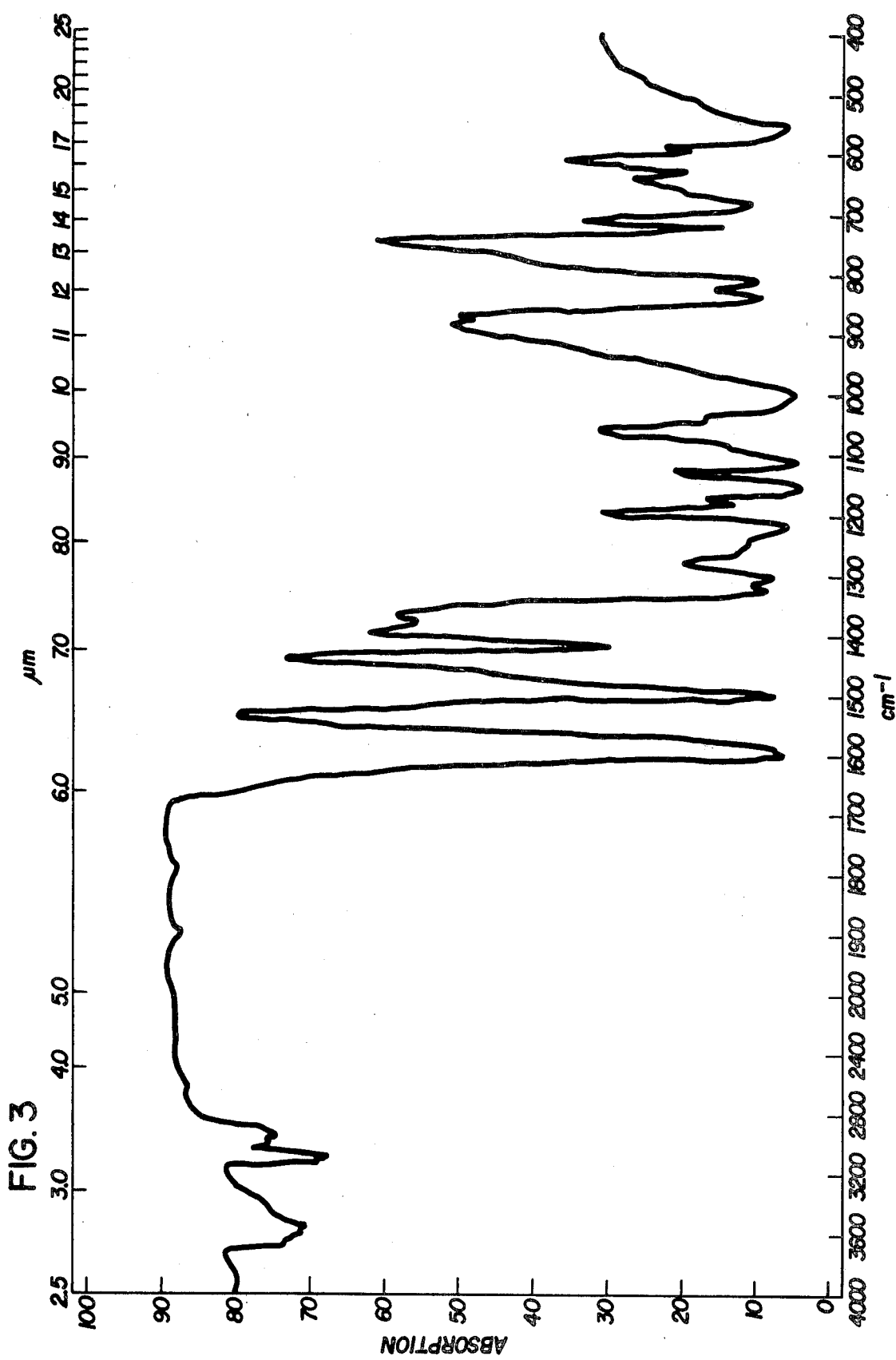

FIG. 3 shows the infrared absorption spectrum of the polymer. The polymer had an intrinsic viscosity [η] of 1.30 dl/g in dimethylacetamide at 32° C., and a melting point of 224° C. to 236° C. A film was prepared from the polymer by casting as in EXAMPLE 1. It showed a tensile strength of 593 kg/cm². The elemental analysis of the polymer indicated that it contained 28 mol % of

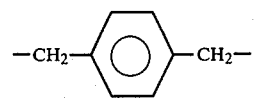

units, and 72 mol % of —CH$_2$— units.

EXAMPLE 4

Figure 4:
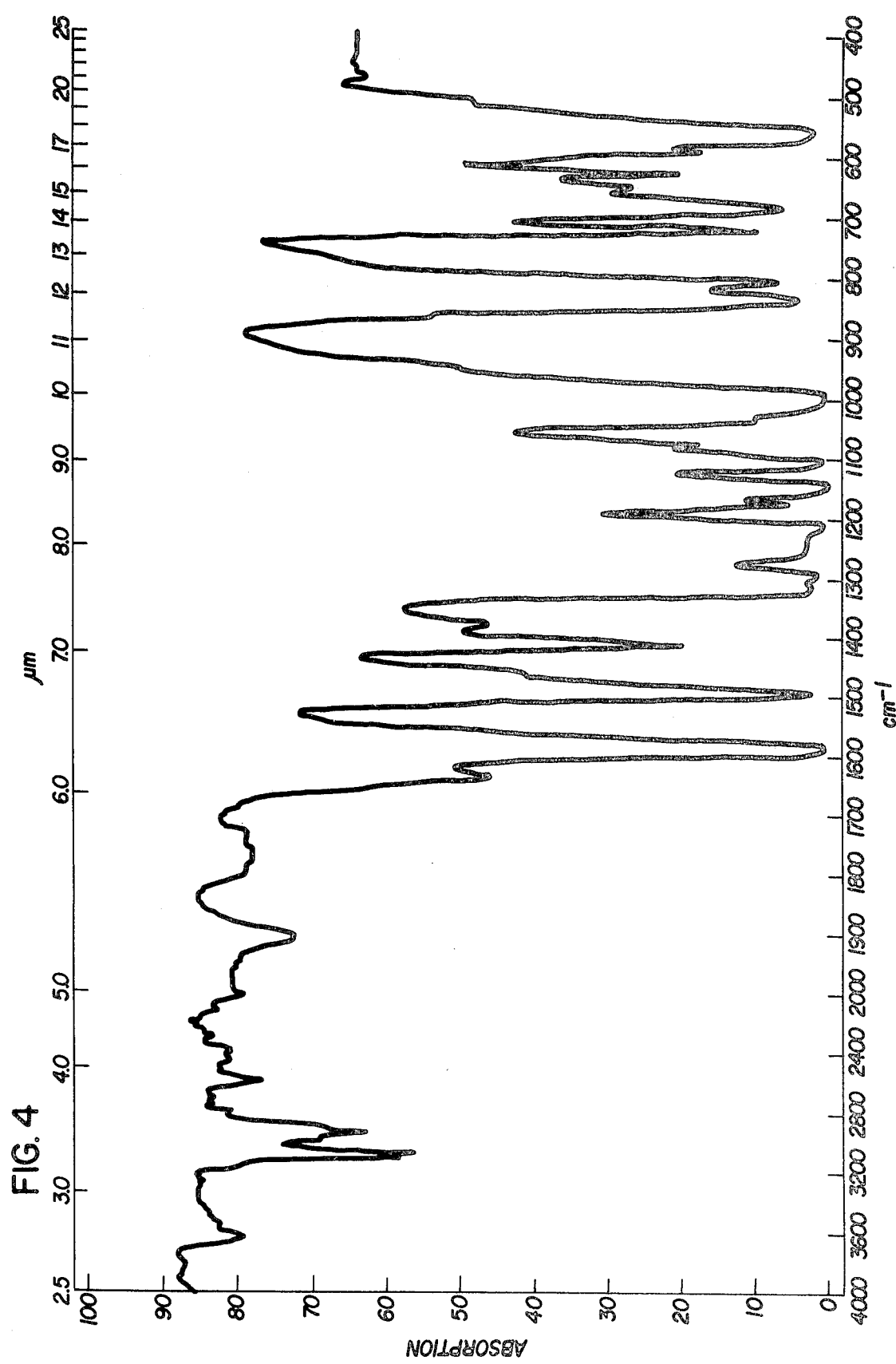

A polymer was prepared by repeating the procedures of EXAMPLE 1, except that 1.93 millimols of p-xylylene dichloride and 67.3 millimols of methylene bromide were employed. FIG. 4 shows the infrared absorption spectrum of the polymer. The elemental analysis of the polymer indicated that it contained 20 mol % of

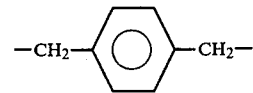

units, and 80 mol % of —CH$_2$— units. It showed an intrinsic viscosity [η] of 1.08 dl/g in dimethylacetamide at 32° C.

EXAMPLE 5

A polymer was prepared by repeating the procedures of EXAMPLE 1, except that 0.97 millimol of p-xylylene dichloride and 67.3 millimiols of methylene bromide were employed.

Figure 5:
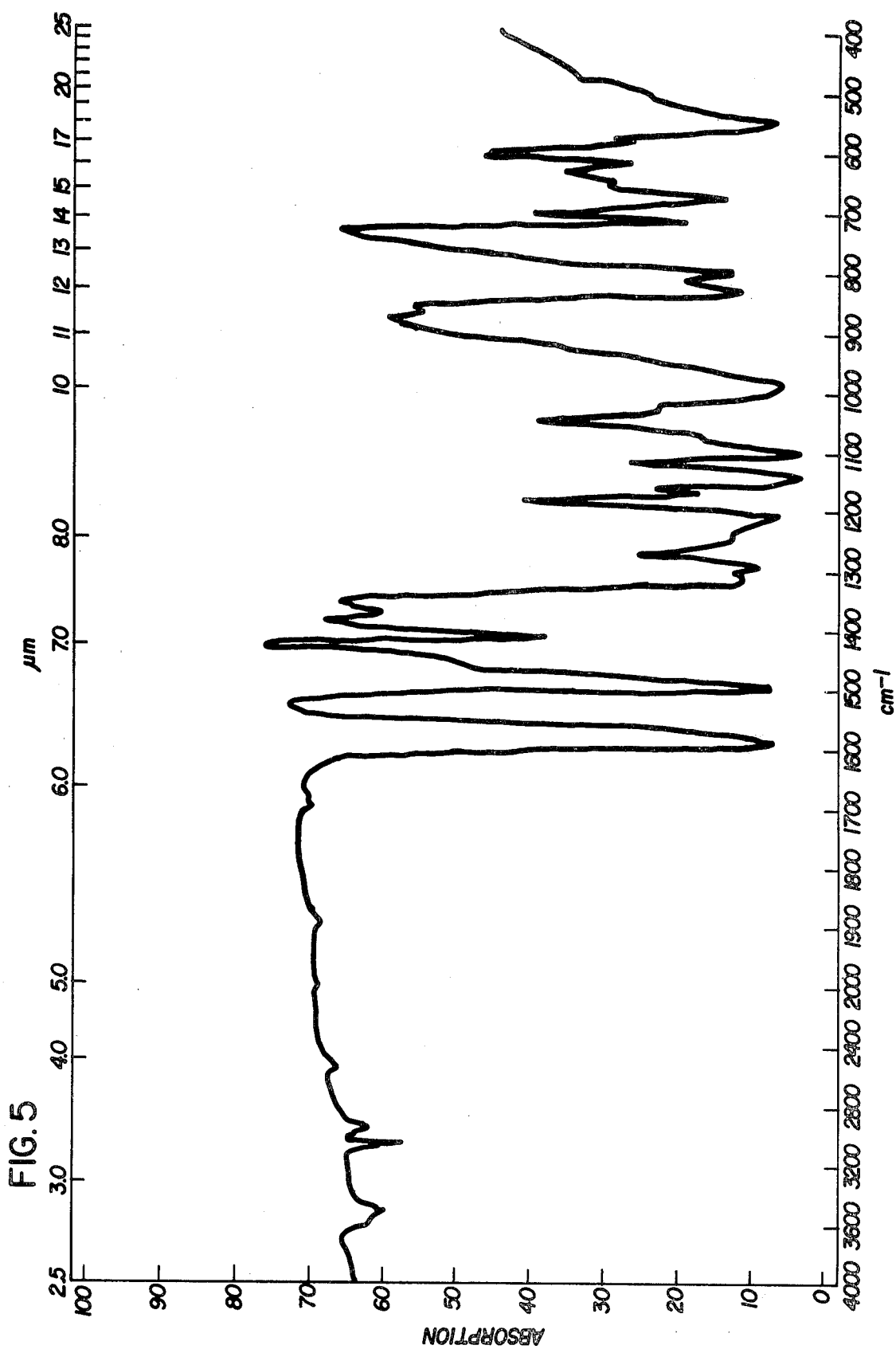

The polymer had a melting point of 245° C. to 265° C. Its infrared absorption spectrum is shown in FIG. 5. It showed an intrinsic viscosity [η] of 0.56 dl/g in dimethylacetamide at 32° C. The elemental analysis of the polymer indicated that it contained 5 mol % of

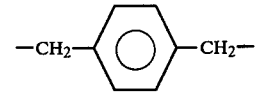

units, and 95 mol % of —CH$_2$— units.

EXAMPLE 6

Figure 6:
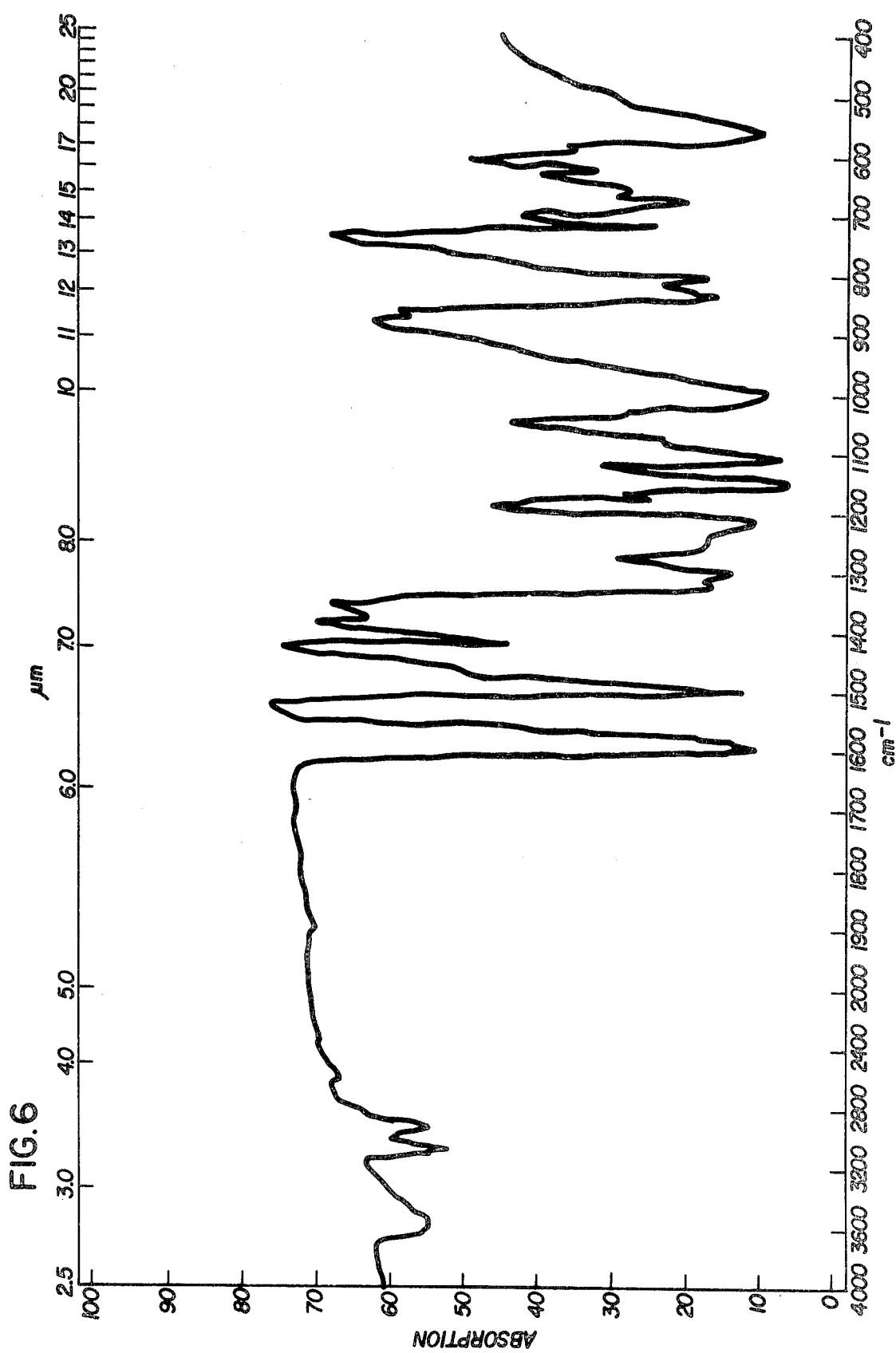

40 Millimols of sodium hydroxide were dissolved in 50 ml of water, and 10 millimols of bisphenol-S were added thereinto to form a homogeneous solution. Added further thereinto were 5 millimols of 1,4-bis(-chloromethyl)durene and 10 ml of methylene bromide in 50 ml of orthodichlorobenzene, and 1 millimol of trioctylmethylammonium chloride. The resulting solution was subjected to reaction at 90° C. for four hours, whereby a polymer was precipitated therefrom. The polymer was purified in accordance with the method described in EXAMPLE 1. It showed an intrinsic viscosity [$\eta$] of 0.90 dl/g in a mixed solvent containing equal proportions of phenol and tetrachloroethane. It had a melting point of 240° C. to 260° C. Its infrared absorption spectrum is shown in FIG. 6.

What is claimed is:

1. A polyether comprising recurring units of the general formula:

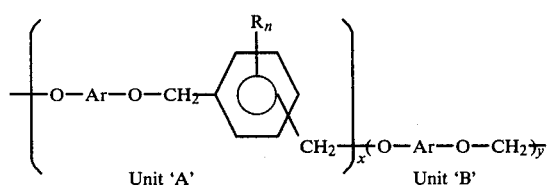

in which Ar stands for a divalent organic group of the aromatic series, R stands for a group selected from the group consisting of CH$_3$, CH$_3$CH$_2$, Cl and Br, and n is an integer of 0 to 4, said polyether containing at least 1 mol % of said unit 'B'.

2. A polyether as set forth in claim 1, having an intrinsic viscosity [$\eta$] of at least 0.1 dl/g.

3. A polyether as set forth in claim 1, wherein said organic group is represented by the general formula:

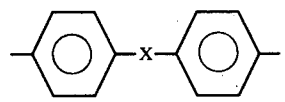

in which X stands for

—SO$_2$—, —CH$_2$—, —O— or —S—.

4. A polyether as set forth in claim 1, wherein said organic group is represented by the formula

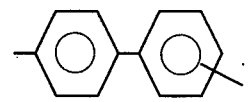

5. A polyether as set forth in claim 1, wherein said organic group is represented by the formula

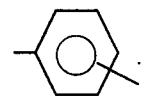

6. A method of manufacturing a polymer having recurring units of the general formula:

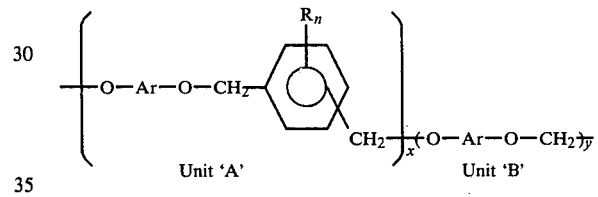

in which Ar stands for a bivalent organic group of the aromatic series, R stands for a group selected from the group consisting of CH$_3$, CH$_3$CH$_2$, Cl and Br, and n is an integer of 0 to 4, said polymer containing at least 1 mol % of said unit 'B', said method comprising reacting an alkali metal salt of a difunctional phenol represented by the general formula MO—Ar—OM', in which M and M' each stand for an alkali metal, and Ar stands for a divalent aromatic group, with a mixture of xylylene and methylene dihalides.

7. A method as set forth in claim 6, wherein said alkali metal salt comprises an aqueous solution of sodium or potassium hydroxide containing said difunctional phenol, and is reacted with said halide mixture in the presence of a phase transfer catalyst.

8. A method as set forth in claim 7, wherein said catalyst comprises an oil-soluble quaternary ammonium salt.

9. A method as set forth in claim 7, wherein said catalyst comprises a quaternary phosphonium salt.

* * * * *